United States Patent [19]

Safiuddin et al.

[11] Patent Number: 4,532,597
[45] Date of Patent: Jul. 30, 1985

[54] DIGITAL INERTIA COMPENSATION GENERATOR AND REEL MOTOR DRIVE SYSTEM EMBODYING THE SAME

[75] Inventors: Mohammed Safiuddin, Williamsville; Bhupendra S. Surana, East Amherst, both of N.Y.

[73] Assignee: Westinghouse Electric Corp., Pittsburgh, Pa.

[21] Appl. No.: 401,426

[22] Filed: Jul. 23, 1982

[51] Int. Cl.³ .................. G06G 7/26; B65H 59/38
[52] U.S. Cl. .................. 364/471; 328/181; 318/6; 318/7; 242/45; 242/75.51
[58] Field of Search .............. 364/469, 470, 471, 607, 364/718, 719, 722, 851, 857, 858; 307/228, 263, 490; 328/181, 185; 242/45, 75.45, 75.5, 75.51, 75.52, 75.53, 191; 318/6, 7

[56] References Cited

U.S. PATENT DOCUMENTS

| | | | |
|---|---|---|---|
| 2,862,161 | 11/1958 | Abell | 318/6 |
| 3,189,804 | 6/1965 | Dolphin et al. | 318/6 |
| 3,548,270 | 12/1970 | Silva | 318/6 |
| 3,686,639 | 8/1972 | Fletcher et al. | 340/172.5 |
| 3,762,663 | 10/1973 | Nedreski | 364/471 |
| 3,814,310 | 6/1974 | Safiuddin | 318/6 |
| 3,944,989 | 3/1976 | Yamada | 340/172.5 |
| 3,976,981 | 8/1976 | Bowden | 340/172.5 |
| 4,023,902 | 5/1977 | Ungerman | 354/101 |
| 4,280,081 | 7/1981 | Dinger et al. | 364/471 |

OTHER PUBLICATIONS

Programmable Logic Controllers-Painless Programming to Replace the Relay Bank; *Control Engineering;* by G. Lapidus; Apr. 1971.

*Primary Examiner*—Jerry Smith
*Assistant Examiner*—Allen MacDonald
*Attorney, Agent, or Firm*—Charles Lorin

[57] ABSTRACT

A programmable controller which generates a digital normalized diameter signal and a digital normalized reel strip velocity signal is adapted for the generation of inertia compensation either with a constant torque, a constant horsepower, or a maximum torque reel system.

3 Claims, 18 Drawing Figures

DIGITAL INERTIA COMPENSATION GENERATOR AND REEL MOTOR DRIVE SYSTEM EMBODYING THE SAME

CROSS-REFERENCE TO RELATED APPLICATIONS

Copending patent application Ser. No. 06/401,287, filed July 23, 1982, entitled "Digital Ramp Function Generator and Motor Drive System Including the Same", by W. H. Snedden and M. Safiuddin, herein incorporated by reference.

Copending patent application Ser. No. 06/401,425, filed July 23, 1982, entitled "Digital Coil Diameter Function Generator and Reel Motor Drive System Embodying the Same" by B. S. Surana and W. H. Snedden, herein incorporated by reference.

BACKGROUND OF THE INVENTION

The invention relates to function generators, in general, and more specifically to an inertia compensation function generator for accelerating and/or decelerating a reel motor drive system.

It is important for the operator to be able to controllably accelerate, or decelerate, a reel motor drive system from some initial speed to a selected terminal speed. This is particularly useful in a rolling mill, in a paper mill, where a strip of material is being unwound from a pay-off reel and rewound on a delivery reel. The tension of the strip is to be maintained constant as a function of varying diameters on the reel, and the motor drives are automatically controlled in speed for that purpose. Accordingly, the rate of change of the speed, depending upon the size of the reels and the nature of the strip, has to be defined and set under varying circumstances by the operator. Moreover, in a rolling mill, where the strip is passed through processing roll stands, the stands are controlled in speed under a master reference with individual stand speed regulators maintaining constant mass flow between the pay-off reel and the delivery reel. In such a case, it is necessary to be able to adjust immediately the speed rate collectively and individually at each stand as the overall process requires. In particular, when changing reels between pay-off and delivery ends it is required to stop winding at the operator's command and to rewind, or unwind. All operations require a phase speed adjustment with acceleration and/or deceleration of inertia loaded parts.

It is common at the present time to generate the inertia compensation function for controlled acceleration and/or deceleration of a motor drive using operational amplifiers. However, operational amplifiers are subject to drift. In this respect, reference is made to U.S. Pat. No. 3,814,310.

It is now proposed to take advantage of digital treatment and microprocess technology in order to improve both cost and sophistication and at the same time provide an equipment which can be handled by an operator devoid of the expertise normally required in programming and customizing the equipment in the field.

SUMMARY OF THE INVENTION

The invention resides in providing a ladderdiagram programmable controller for logically establishing inertia compensation function in a reel system motor drive. The ladder diagram according to the present invention can be adjusted in the field by the plant operator while taking into account instantaneous operative conditions exchanging and selecting pay-off and delivery coils of strip material at both ends of a reel system. The programmable controller is readily adaptable for operation with a constant torque, a constant horsepower, or a maximum torque direct current motor drive reel regulating system.

DESCRIPTION OF THE PREFERRED EMBODIMENT

Figure 1:
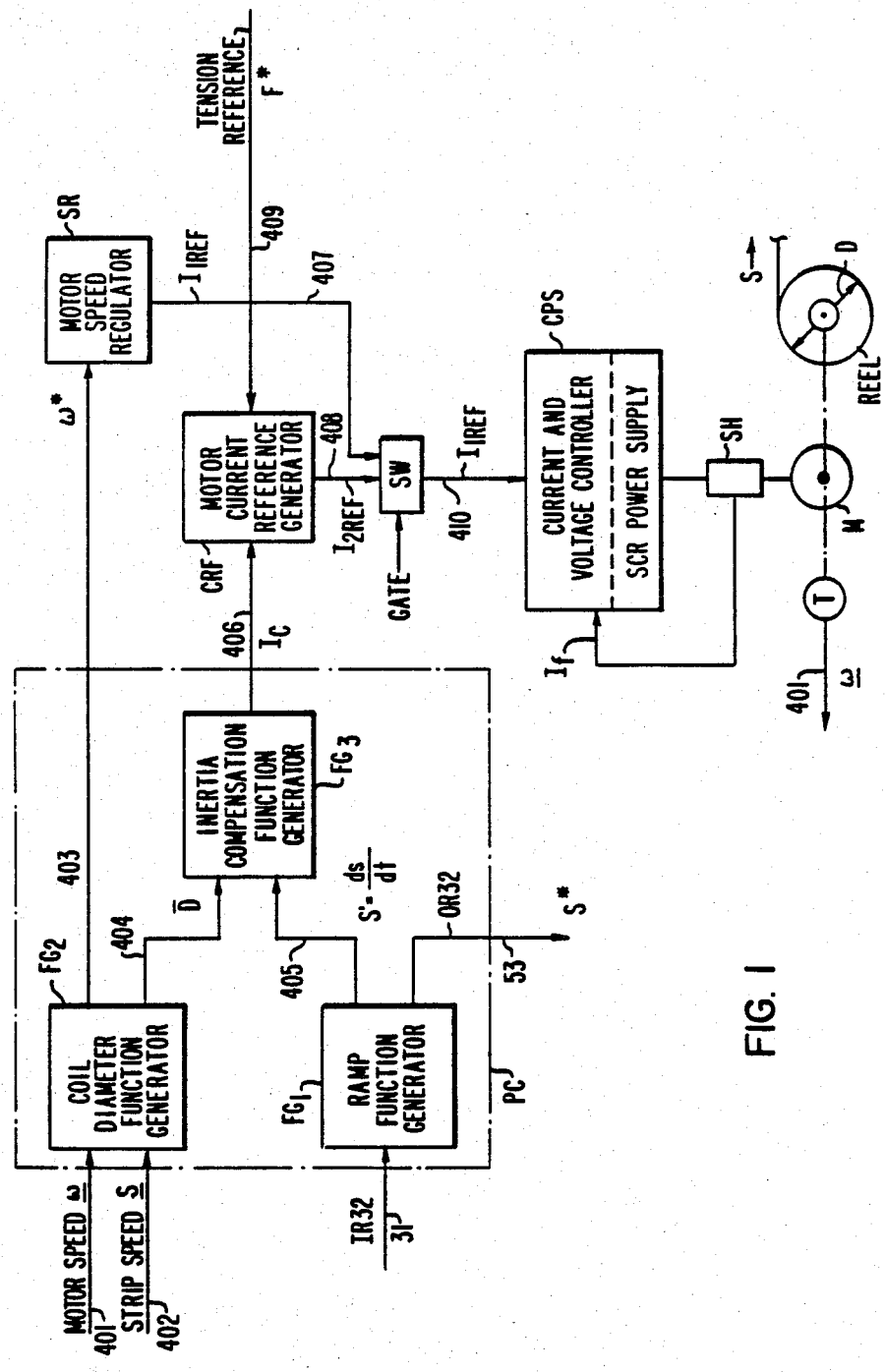
FIG. 1 illustrates the programmable controller according to the invention in a reel motor drive system.

Referring to FIG. 1, a reel drive control system is illustrated embodying a programmable controller including three function generators, $FG_1$, $FG_2$ and $FG_3$.

Function generator $FG_1$ is a ramp function generator used for the generation of a reference strip velocity signal S* and a signal $$S^{\cdot} = \frac{ds}{dt}$$

representative of the derivative thereof. Function generator $FG_1$ is fully described in copending patent application Ser. No. 06/401,287, filed July 23, 1982 concurrently with the present application by M. Safiuddin and W. H. Snedden.

Function generator $FG_2$ is a coil diameter calculation function generator used for the generation of a signal representing the instantaneous normalized diameter of the coil on the reel $\overline{D}$, and a motor speed reference signal $\omega^*$ to be applied to the motor speed regulator SR of the reel drive system. Function generator $FG_2$ is fully described in copending patent application Ser. No. 06/401,425, filed July 23, 1982, concurrently with the present application by B. S. Surana and W. H. Snedden.

Function generator $FG_3$ is an inertia compensation function generator according to the present invention. It is used to generate during acceleration and/or deceleration a compensating current $I_c$ for the motor current reference generator CRF of the reel system.

Figure 2:
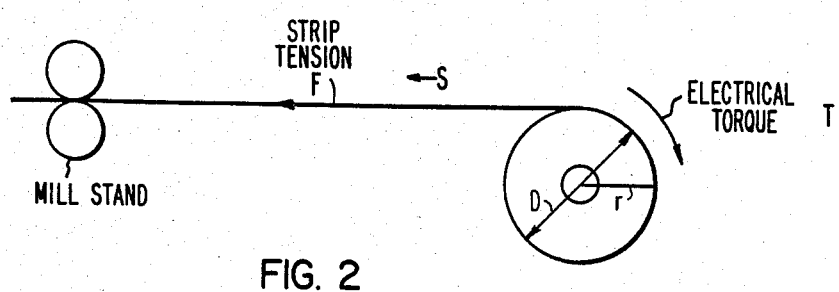
FIG. 2 is illustrative of the parameters of a reel in rotation with a strip of material pulled through a mill stand.

Referring to FIG. 2, a general reel-tension simplified system is shown to illustrate that the mechanical torque exerted by the reel R is made up of two components: the torque due to strip tension=F and the torque required to overcome inertia during acceleration $=J\,d\omega/dt$. The tension in the strip is related to the torque at the center of the core as follows:

$$F = 2 \cdot \frac{T}{D} \quad (1)$$

where,
F=Strip or web tension ($F_r$ as rated value).
T=Torque at the axis of the core ($T_r$ as rated value). and
D=Diameter buildup on the core ($D_r$ as max diameter).

The linear speed of the strip is related to the rotational speed of the core by $$S = \pi D N \quad (2)$$

where,
S=Strip linear speed ($S_r$ as rated value).
and
N=Rotational speed of the core ($N_r$ as rated value at max. diameter).

Defining the rated values for the variables, we can normalize, or per-unitize the above equations. Thus, equations (1) and (2) can be normalized by reference to the rated values, e.g., equations in which the values of $\bar{F}, \bar{D}, \bar{T}$ are per-unit values, as follows:

$$\bar{F} = \frac{F}{F_r} = \frac{2 \cdot T}{F_r D} = \frac{2 \cdot T}{2 T_r} \cdot \frac{D_r}{D} = \frac{\bar{T}}{\bar{D}} \quad (1a)$$

where, $$\frac{F}{F_r} = \bar{F}; \frac{T}{T_r} = \bar{T}; \text{ and } \frac{D}{D_r} = \bar{D}$$

Equation (1a) is dimensionless. Similarly, equation (2) becomes $$\bar{S} = \bar{D}\bar{N} \quad (2a)$$

$$\bar{S} = \frac{S}{S_r}; \bar{N} = \frac{N}{N_r}$$

From equations, (1a) and (2a) it is observed that, where tension in the strip is to be maintained constant for all diameter values, the torque applied at the axis of the core must increase proportionately to the diameter. Similarly, should the strip speed remain constant, the rotational speed of the core must stay inversely proportional to the diameter.

For a reel mechanism driven by a DC motor, the torque and speed of the motor must be controlled to satisfy the above-stated relationships. Considering now the equations which express the relationship between the output variables (speed, torque) and the input variables (voltage, current, flux) of a DC motor system, the output torque is related to the motor current and flux as follows:

$$T_m = K'_T \phi I \quad (3)$$

The counter emf (CEMF) of the motor is related to speed and field flux as follows:

$$E = K'_v \phi \omega \quad (4)$$

As to the motor torque and speed, the relationship is the following:

$$T_m = J \frac{d\omega}{dt} + T_t + T_L \quad (5)$$

where;
E=Motor CEMF (rated value $E_r$).
$\phi$=Motor flux (rated falue $\phi_r$).
$\omega$=Motor speed (rated falue $\omega_r$).
I=Motor current (rated value $I_r$).
$T_t$=Load torque due to tension
$T_1$=Motor torque due to losses
$K'_v$=Voltage constant and $K'_T$=Torque constant Normalizing equations (3), (4) and (5), leads to:

$$\bar{T}_m = \bar{\phi}\bar{I}_a \quad (3a)$$

$$\bar{E} = \bar{\phi}\bar{\omega} \quad (4a)$$

$$\bar{T}_m = \frac{J\omega_r}{K_T I_r} \frac{d\bar{\omega}}{dt} + \bar{T}_t + \bar{T}_L \quad (5a)$$

where, $$K_T = K'_T \phi_r$$

Assuming direct coupling between the motor and the load and steady state operation, the following relationships obtain:

$$\bar{T}_m = \bar{\phi}\bar{I}_a = \bar{F} \cdot \bar{D} \quad (6)$$

or $$\bar{F} = \frac{\bar{\phi}}{\bar{D}} \cdot \bar{I}_a$$

where $I_a$ is the motor current component producing torque to maintain tension.

Since normalized rotational speeds of the motor and load are equal, it follows:
$E = \phi \bullet \omega = \phi \bullet S/D$.

or, $$\bar{S} = \bar{D}/\bar{\phi} \bullet \bar{E} \quad (7)$$

Equations (6) and (7) are the normalized direct relationships between the force and velocity in the strip and the motor voltage and current.

Depending upon the method of control of these variables three types of reel regulating system are possible: (1) the constant torque system, (2) the constant horsepower system and (3) the maximum torque system.

Figure 3:
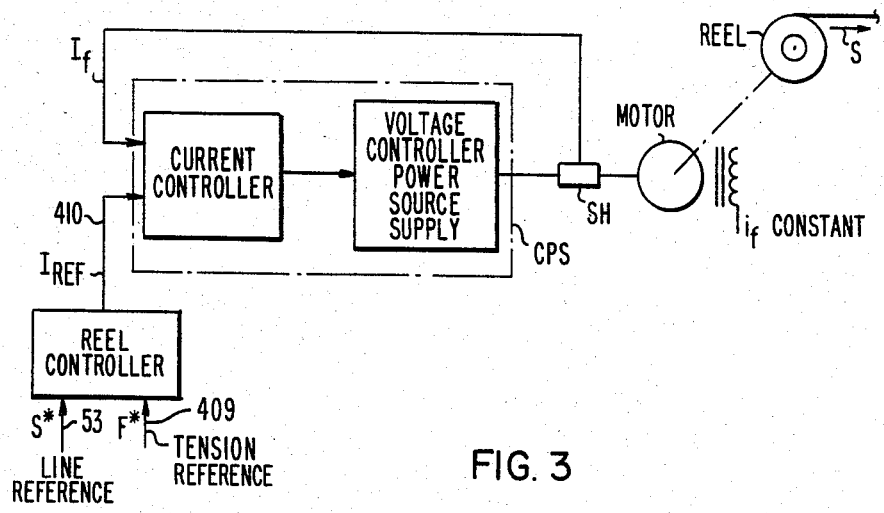
FIG. 3 shows in block diagram a constant torque reel DC motor drive system.

Referring to FIG. 3, a constant torque reel system includes a reel controller responsive to the strip velocity reference signal S* on line 53 and to a tension reference signal F* on line 409. The outputted current reference signal $I_{REF}$ is applied to the current controller together with the feedback armature current $I_a$. The current controller controls a variable voltage power source generating the current of the motor M. In this system the field excitation current $i_f$ is maintained constant so that the motor flux is held constant at its rated value. Thus, $\bar{\phi} = 1$. Equations (6) and (7) then become:

$$\bar{F} = \bar{I}_a/\bar{D} \quad (8)$$

$$S = D \bullet E \quad (9)$$

From these equations it follows that the tension in the strip can be kept constant only if current is kept proportional to the diameter. Conversely, if the current is kept constant, the tension in the strip will decrease in proportion to the diameter build up. The line speed will increase proportionally to the diameter, if the motor voltage is kept constant. To maintain a constant line speed, the motor CEMF must change in an inverse proportion to the diameter.

Figure 4:
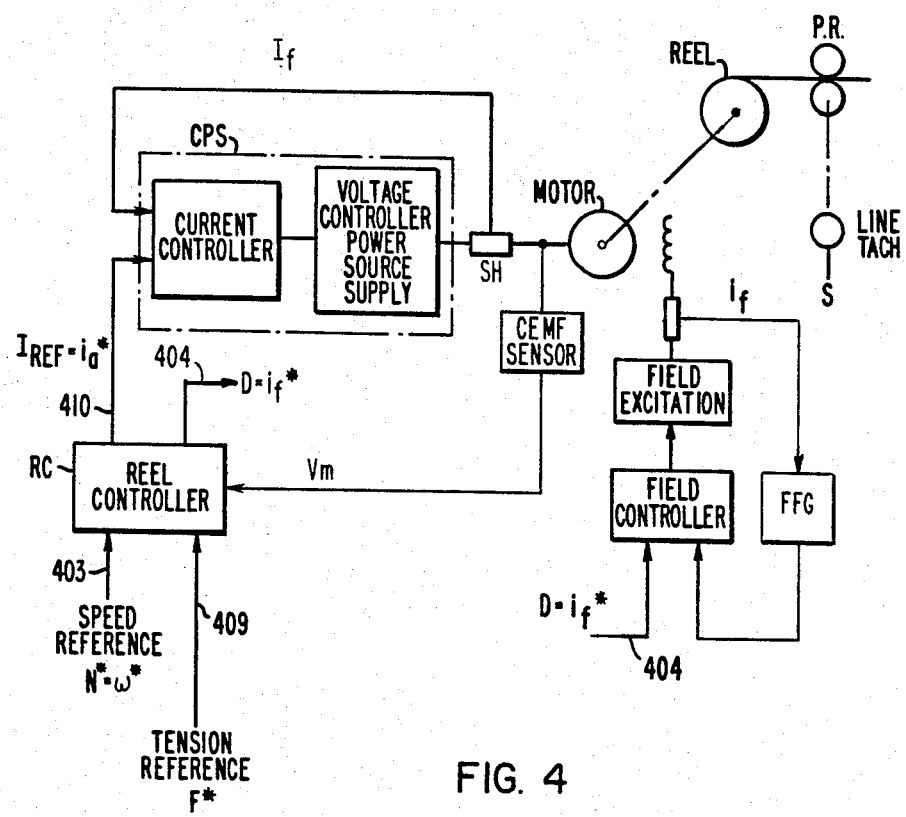
FIG. 4 is a block diagram illustration of a constant horsepower reel DC motor drive system.

Referring to FIG. 4, in the constant horsepower reel system, the counter emf (CEMF) is derived by a sensor CS and by line 420 a motor voltage signal $V_n$ is applied to the reel controller. In the system the field excitation $i_f$ is maintained equal to the diameter D. Accordingly, the reel controller provides a diameter signal D which by line 404 is applied to the field controller of the motor as a reference signal $i_f$. The field current $i_f$ is fed back to the flux function generator FFG.

In this system, the motor flux is kept proportional to the diameter making ratio $$\frac{\bar{\phi}}{\bar{D}} = \frac{\bar{D}}{\bar{\phi}} = 1$$

Equations (6) and (7) become the following:

$$\bar{E} = \bar{I}_a \tag{10}$$

$$\bar{S} = \bar{E} \tag{11}$$

From these equations it appears that the tension in the strip can be kept constant by keeping $\bar{I}_a$ constant. Similarly, the constant line speed results in constant motor CEMF. At 50% of rated speed, the CEMF is also 50%. Since motor flux is kept proportional to the diameter, the flux is at its minimum value for the empty mandrel and is independent of line operating speed. This system requires that the motor flux range, and hence the ratio of weak field speed to base speed, be equal to the diameter buildup range.

Figure 5:
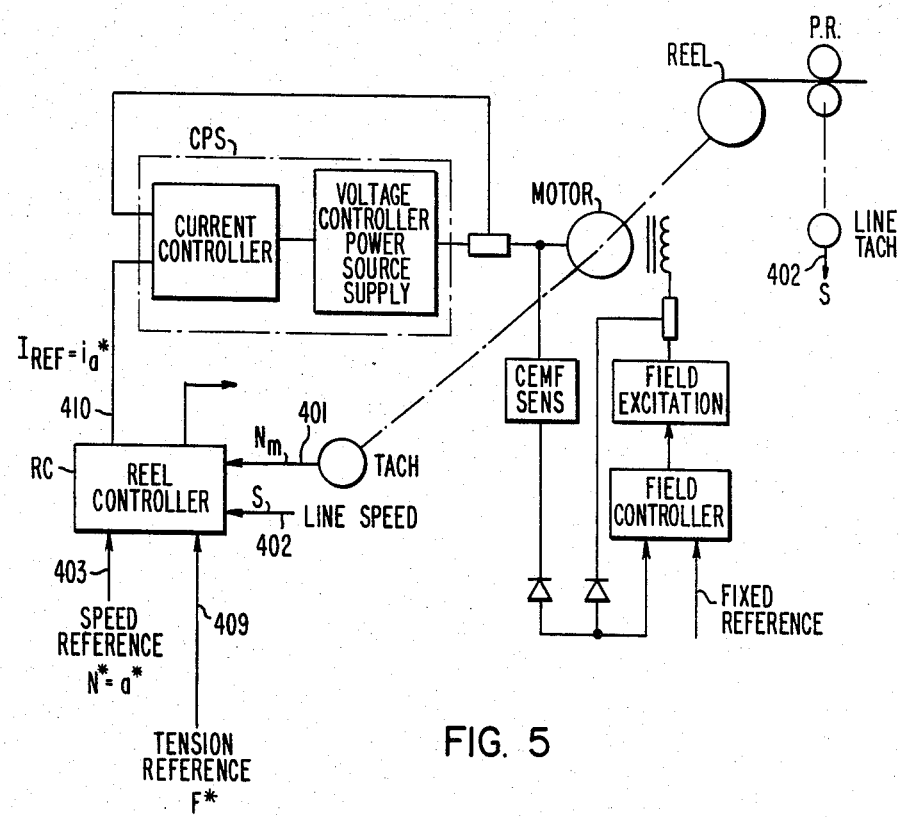
FIG. 5 is a maximum torque reel drive system.

Referring to FIG. 5, in the maximum torque system there is a combination of the two preceding systems. The current is maintained proportional to the diameter to keep constant tension, and the CEMF of the motor varies while being inversely proportional to the diameter for a constant strip velocity. The flux is held at its rated value as long as the motor CEMF is below rated value. Once the motor CEMF reaches the rated value, the flux is weakened in a direct ratio to the change in diameter. This can be expressed as follows:

$$\bar{\phi} = 1 \text{ for } \bar{E} < 1$$

$$\bar{\phi}/\bar{D} = \text{Constant } K \text{ for } \bar{E} = 1$$

The system equations become:

$$\bar{F} = \frac{\bar{I}_a}{\bar{D}} \text{ for } \bar{\omega} < 1 \tag{12a}$$

$$\bar{F} = \bar{I}_a \cdot \frac{\bar{\phi}}{\bar{D}} \text{ for } \bar{\omega} \geq 1 \tag{12b}$$

$$\bar{S} = \bar{D} \cdot \bar{E} \text{ for } \bar{\omega} < 1 \tag{13a}$$

$$\bar{S} = \frac{\bar{D}}{\bar{\phi}} \cdot \bar{E} \text{ for } \bar{\omega} \geq 1 \tag{13b}$$

From equations (12a) and (13a) it is seen that, in this system, the current is maintained proportional to the diameter to keep constant tension, and the CEMF of the motor is inversely proportional to the diameter for a constant line speed.

Equation 12b can be rewritten by multiplying the numerator and the denominator by $\bar{\omega}$. Therefore:

$$\bar{F} = \bar{I}_a \cdot \frac{\bar{\phi} \bar{\omega}}{\bar{D} \bar{\omega}} = \bar{I}_a \cdot \frac{\bar{E}}{\bar{S}} \tag{14}$$

but $$\bar{E} = 1 \text{ for } \bar{\omega} \geq 1;$$

which results in $$\bar{F} = \bar{I}_a \cdot \frac{1}{\bar{S}} = \frac{\bar{I}_a}{\bar{S}} \tag{15}$$

The current, therefore, should be kept proportional to the line speed under this mode of operation. The CEMF of the motor, of course, remains at rated value. Thus, $\bar{E} = 1$, regardless of the line speed.

As indicated by these relationships, the range of the motor flux can be, and is generally smaller than the diameter range.

Accordingly, as shown in FIG. 5, the maximum torque system requires as inputs to the reel controller a strip velocity signal S* on line 402, a motor speed reference signal (N*, ω*) on line 403, a motor speed feedback signal ($N_m$ ω) on line 401, a tension reference signal F* on line 409, and the reel controller must provide a diameter signal D=$i_f$* on line 404 to the field controller. In a constant horsepower system, the value of the flux depends upon the coil buildup and hence it is always at its minimum value with winding reels having empty mandrels. The motor armature current in a maximum torque system is less than, or equal to, that of armature current in a constant horsepower system.

Inertia compensation for a pay-off, or winding reel drive, is complex because the drive inertia changes due to the changing mass of the coil and the motor air gap flux. Referring to the last equation given in the Appendix describing the calculation for inertia compensation, the inertia compensation signal for reel systems can be expressed by the following normalized (dimensionless) equation:

$$\bar{I}_a = (a_1 \bar{D}^2 + a_2/\bar{D}^2) \cdot \frac{\bar{D}}{\bar{\phi}} \cdot \frac{d\bar{S}}{dt} \tag{16}$$

where
$\bar{D}$ = normalized diameter with $\bar{D}_{max} = 1$
$\bar{\phi}$ = normalized motor flux with $\bar{\phi}_{max} = 1$
$\bar{S}$ = normalized strip velocity with $\bar{S}_{max} = 1$.

It is now proposed to use a programmable controller of the ladder diagram type in order to introduce inertia compensation for a reel system.

The invention will be described in the context of a NUMA-LOGIC 700 Series Programmable Controller currently on the open market and advertised by Westinghouse Electric Corporation, NUMA-LOGIC Department, 32031 Howard Street, Madison Heights, Mich. 48071.

Figure 6:
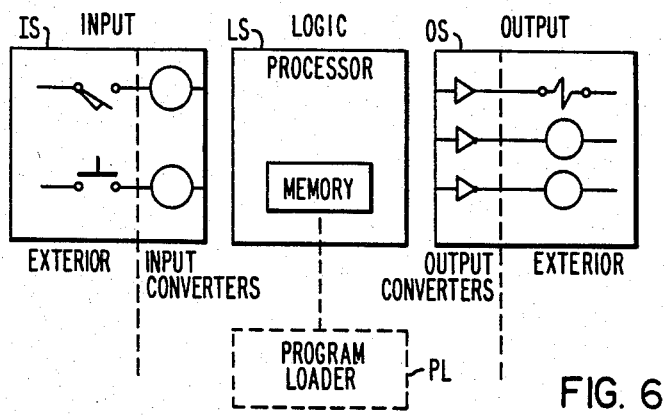
FIGS. 6-14 are illustrations of prior art circuitry representing elementary functions of a programmable controller of the ladder diagram type as can be used in implementing the present invention.

Referring to FIG. 6, the 700 Series Programmable Controller (PC-700) is schematically represented as including an input section (IS), a logic section (LS) and an output section (OS). The logic section includes a processor and a memory under control of a program loader (PL).

The input section (IS), typically, includes a plurality of modules associated either with a discrete input, or with an analog input. In a motor drive system the discrete inputs may be ON/OFF for RUN, START, STOP, ACCELERATE, INCH, . . . supplied by pushbuttons, switches, contacts, etc. The individual signal is converted by the input circuit of the associated discrete input module to a proper processor voltage representing a ONE, or ZERO.

The analog input, which in a motor drive may be a feedback armature speed signal, a tension reference signal set point, . . . is converted by the associated circuit of the analog input module to a byte representation stored in a register at processor voltages, e.g., ZERO's and ONE's. The multi-bit signals supplied by thumbwheels, instrumentation, are converted by the module to processor voltages. Typically, a multiplexed register input module allows to process up to sixteen 4-digit BCD numbers. Whereas a single-point register accepts only a single 16-bit number, typically, all register input modules accept 5 volts TTL signals and have the equivalent height of two discrete modules.

The output section is similar to the input section, but conversion is effected in the opposite direction. Each output circuit converts a processor signal to the voltage and current levels required by individual output devices, such as motor starters, solenoids and pilot lights. Analog output circuits convert multi-bit register information at processor voltages to the analog levels required by the associated instrumentation. For instance, the outputted signal may be in the range from 0 through 10 volts, of 4 through 20 milliamperes. Again, register output module circuits are provided to convert 16-bit register data at processor voltages to the 5 volts TTL levels typically required for instrumentation and readouts. Single register output circuits are provided, as well as multiplexed register output modules where group readouts are required.

Figure 7:
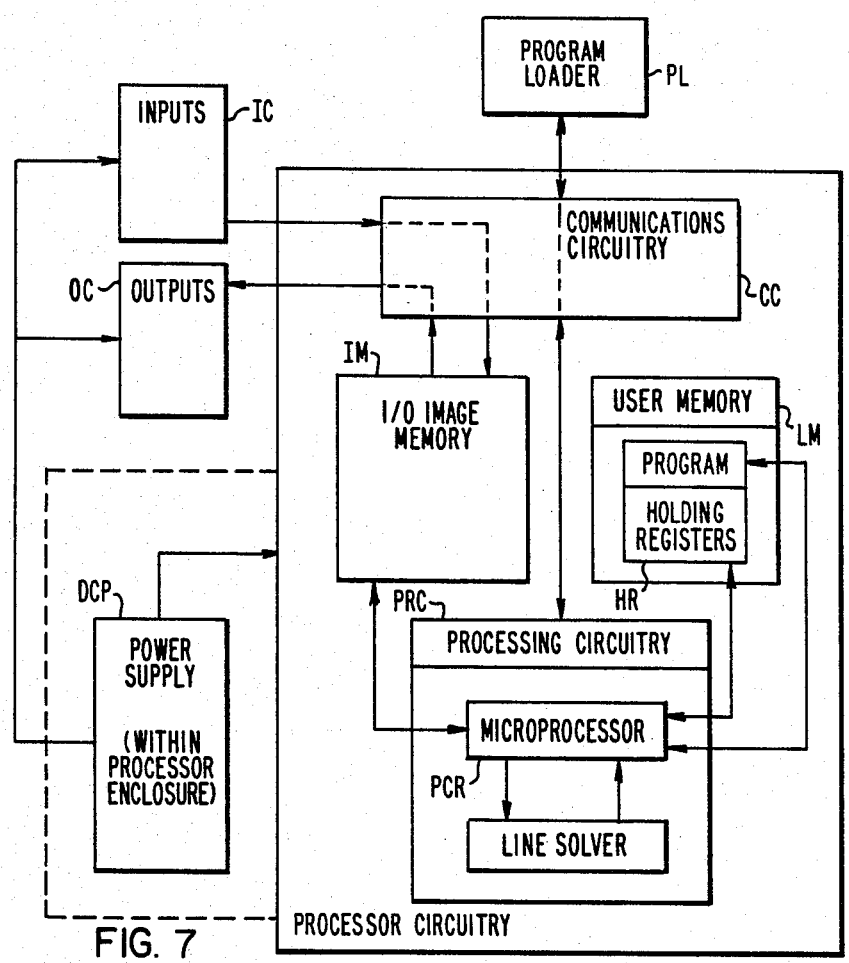

Referring to FIG. 7, the processor, in the processor section (PS), coordinates the operation of the total PC-700 control system. It includes a ladder memory (LM) containing instructions programmed by the program loader (PL).

The programmable logic controller is well known. See for instance "Programmable Logic Controllers-Painless Programming to Replace the Relay Bank" by G. Lapidus in Control Engineering, April 1971, pp. 49–60. Its application as a controller for machine equipment may be typified by U.S. Pat. No. 4,023,902; 3,944,989; 3,976,981 and 3,686,639. This prior art is illustrative of "a ladder program, logic diagram, or boolean equations that specify a control sequence" to be entered directly into the controller by the operator on the program loader "pressing the appropriate buttons on a programming panel, or by writing instructions from a simple application-oriented instruction set" (Lapidus page 49 column 2). Accordingly, a technician not familiar with programming techniques will be able to establish with the programmable logic controller the internal logic required for the particular application. This is achieved by developing a ladder diagram simulating between an input line and an output line a succession of parallel circuits activated in a scanning order one at a time, each circuit involving a relay coil and associated contacts which determine, when the relay is activated or deactivated, the electrical connection via contacts for a subsequent logic step through a subsequent circuit.

The ladder memory (LM) of FIG. 7 serves as the storage location for any holding register values (HR) required under the program. The I/O image memory (IM) of FIG. 7 contains the status of all the input circuits at the beginning of each scan of the ladder diagram sequence, and stores the newly determined coil and output register states upon each step of the ladder reached during the scan.

The processing circuitry simulating actual logic through the processor section is established with the program loader by the operator so as to construct, contact-by-contact, each circuit in the ladder diagram according to the program. The selected contacts are used to determine whether the circuit is conducting. When a coil is controlled by the associated circuit becoming conductive or non-conductive, the coil determines the state of its contacts depending upon whether they are normally open, or normally closed contacts. The state of the coil is stored in the I/O image memory according to the newly determined state of the circuit. As the beginning of each scan of the ladder, the states of the input circuits are transferred to the I/O image memory by the communications circuitry (CC). At the end of each scan of the ladder, the communications circuitry (CC) transfers the output states stored in the I/O image memory to the output circuits. The communications circuitry also transfers the instruction from the program loader (PL) to the processor.

Figure 8:
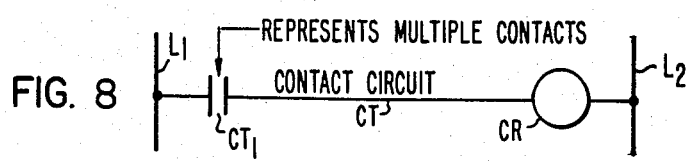

DC power is provided to operate the processor, and the input and output circuits. Referring to FIG. 8, an elementary control relay coil (CR) is connected in circuit by line CT with normally open contacts $CT_1$ between $L_1$ and $L_2$ the input and output lines of the ladder, respectively.

Figure 9:
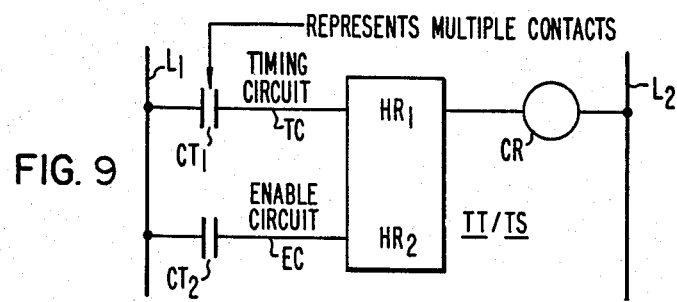

Referring to FIG. 9, circuit control timer (TT/TS) is illustrated including a preset value registered in a holding register $HR_1$ (of the I/O image memory) and a destination holding register $HR_2$. A timing circuit (TC) with contacts $CT_1$ and an enable circuit (EC) with contacts $CT_2$ are associated with the holding registers $HR_1$ and $HR_2$, respectively. The timer, a local clock, is allowed to run only when the timing circuit is conducting. When the timer is running, increments of time in digital representation are counted. Accumulated time is stored in the destination $HR_2$, and the associated coil will be energized and its contacts (typically $CT_1$) will be operated when the actual value of $HR_2$ equals the present value of $HR_1$. The timer will retain the accumulated value on $HR_2$ as long as contacts $CT_1$ of the enable circuit are closed. When the enable circuit is not conducting, the timer is reset and $HR_2$ is held back to zero, as well as $HR_1$. The preset value of $HR_1$ may be programmed as a constant along with the timer, or it may come from an input register IR, another holding register HR, or an output register OR, so that its value may be varied.

Thus, the I/O image memory contains representations stored which correspond to an input register IR, or an output register OR, as well as a hold register HR.

Similar teachings are used to represent an add or a subtract function, a divide or a multiply function, a comparison function, which are all to be used in the implementation of the present invention.

Figure 10:
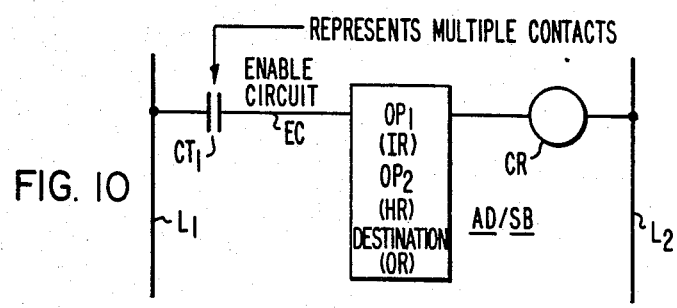

FIG. 10 illustrates the ADD or SUBTRACT function, (AD/SB), including an enable circuit EC having normally open controlling contacts $CT_1$ controlled by the scanning process. Operand $OP_1$ comes from an input register IR (but it may come as well from an output register, or a holding register). Operand $OP_2$ comes from a holding register HR as shown (but it may come as well from an input register, an output register, or it can be a constant value set in the system). The result of the operation is placed in a destination register which is shown as an output register OR, but may be as well a holding register. Typically, the PC-700 allows 4-digit decimal numbers (up to 9999) to be added or subtracted producing a 4-digit decimal result. The addition or subtraction is performed when the enable circuit changes from a non-conducting to a conducting state.

To add, $OP_1$ is added to $OP_2$ and the result placed in destination register OR. If the result is greater than 9999, the coil CR is energized and the amount of overflow (greater than 10,000) is placed in the destination register OR. The coil is energized only if the result exceeds 9999.

To subtract, $OP_2$ is subtracted from $OP_1$, and the result is placed in the destination register (OR in FIG. 10). If the result is less than zero, the coil is energized and this new coil status is stored in memory, thereby to indicate the sign of the error for whatever intended purpose in the system. The amount of under flow (less than 0000) is placed in the destination register OR.

In either case, when the enable circuit EC is not conducting, the coil is deenergized. When the coil is forced, only its contacts (and output circuit if any) are affected; the function continues to operate according to the enable circuit EC.

Figure 11:
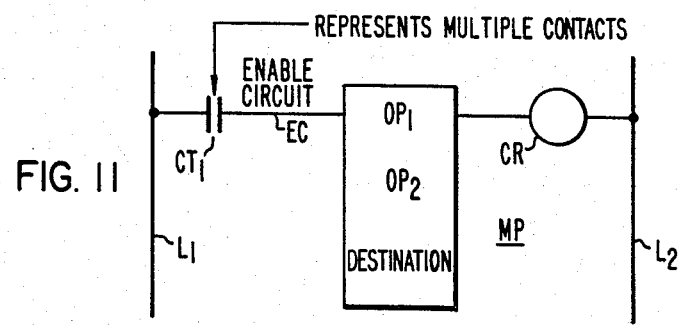

FIG. 11 illustrates the multiply function MP. Two 4-digit decimal numbers (up to 9999) to be multiplied produce up to eight decimal digits. The two numbers are multiplied only when the enable circuit EC changes from a non-conducting to a conducting state (by contacts $CT_1$ in FIG. 11). Operand $OP_1$ may come from an input register, an output register or a holding register. Operand $OP_2$ may come from an input register, an output register, a holding register. It may also be a programmed constant. $OP_1$ and $OP_2$ are stored in binary form (after conversion if the number is in BCD form). The CR coil is energized when the enable circuit EC, through contacts $CT_1$ (as illustrated), is conducting and, conversely, CR is deenergized when EC is not conducting. Forcing the CR coil affects only the associated contacts (and output circuit if any). The CR function continues to operate according to the enable circuit EC. The result of the multiplication is placed in a pair of registers (holding, output, or destination register).

Figure 12:
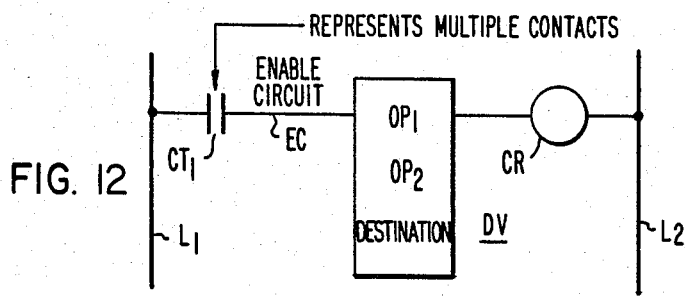

The divide function (DV) is illustrated in FIG. 12. Operand $OP_1$ is divided by operand $OP_2$. $OP_1$ could be an 8-digit decimal number and $OP_2$ a 4-digit decimal number. The result can be up to four digits in this example. $OP_1$ is divided by $OP_2$ when conducting. $OP_1$ comes from a pair of registers (input, output or holding register). The result is placed in a pair of registers (output, holding register) serving as destination registers; the first containing the result, the second containing the remainder.

The CR coil is energized if $OP_2$ equals zero or if the result is greater than 9999 (in the example). The coil is deenergized when the enable circuit EC is not conducting. Forcing the CR coil affects only the associated contacts; the CR function continues to operate according to the enable circuit EC.

Figure 13:
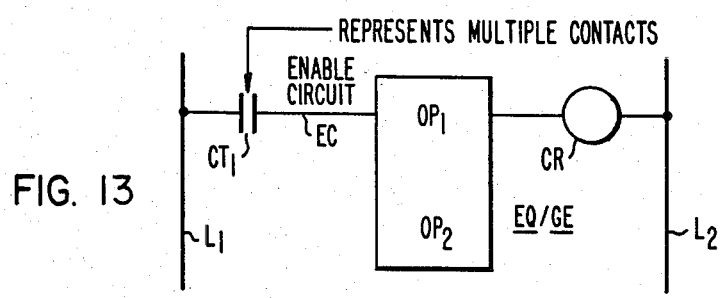

The comparison function EQ/GE is illustrated by FIG. 13. Two operands $OP_1$, $\overline{OP_2}$ are compared when the enable circuit EC conducts. If the EQUAL function is intended between $OP_1$ and $OP_2$, when the enable circuit EC is conducting and $OP_1$ is equal to $OP_2$, coil CR will be energized. If $OP_1$ is not equal to $OP_2$, or if the enable circuit EC is not conducting, the coil will be deenergized.

If the comparison function is intended to establish larger than, or smaller than, between $OP_1$ and $OP_2$, choosing energization of the coil CR when the condition is fulfilled and the enable circuit is conducting, will achieve the result.

Figure 14:
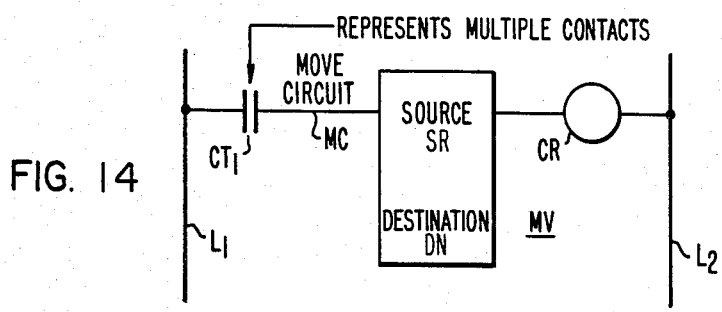

Referring to FIG. 14, the move function is illustrated by block MV associated with a coil CR and contacts $CT_1$. When the move circuit MC is conducting, data is transferred from the source SR to the destination DN. The source may be a holding register, an input register, an output register, an input or an output group. The destination may be a holding register, an output register, or an output group. Such move occurs on each processor scan, and the coil is energized.

Figure 15:
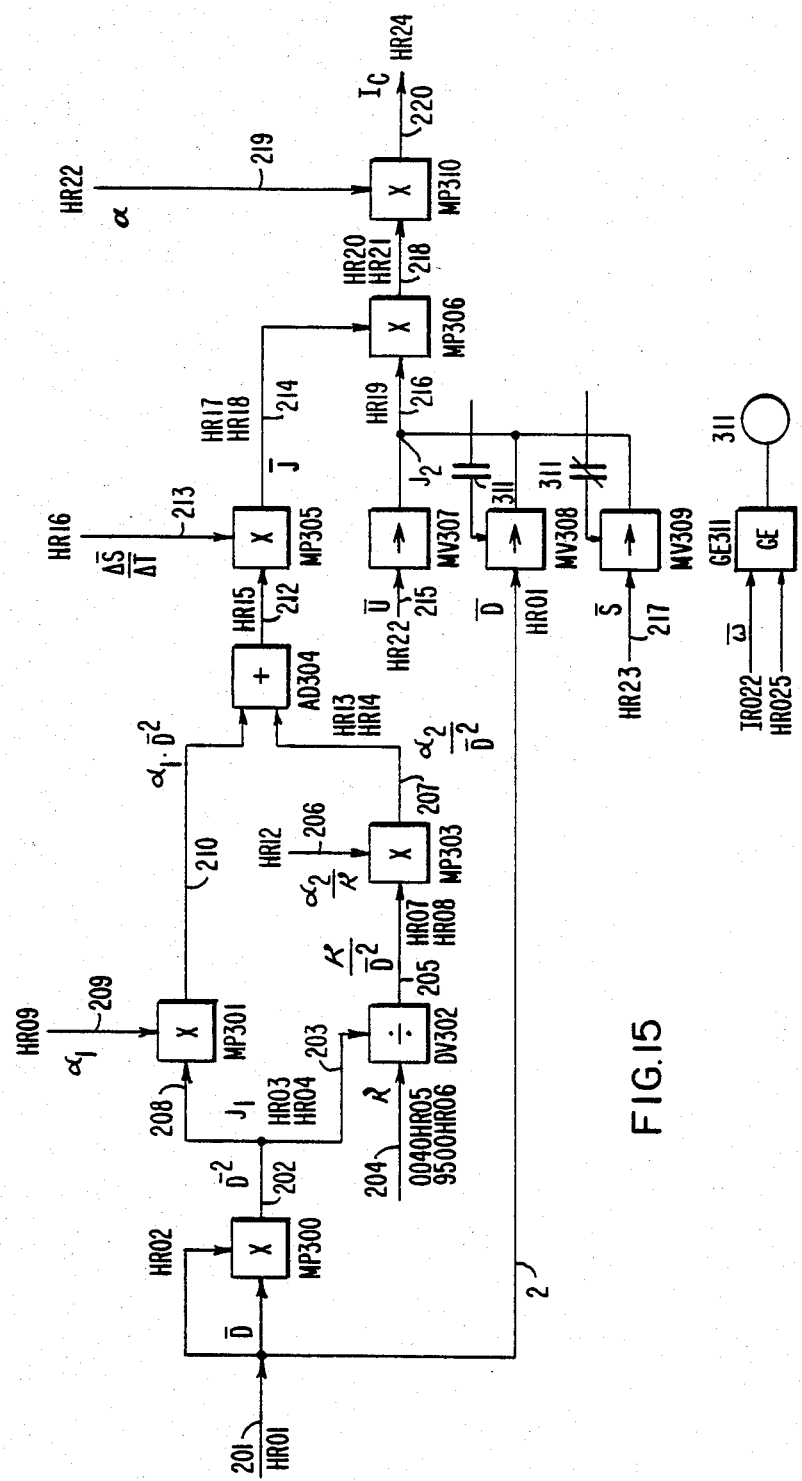
FIG. 15 is a block diagram representation of the inertia compensation function generator used according to the present invention within a programmable controller.

Referring to FIG. 15, the block diagram shows a combination of several of the functions of FIGS. 6–14 arranged to perform inertia compensation according to normalized equation (16), thereby to generate in holding register 24 a current $I_C$ compensating the current reference of the current regulation accordingly.

Considering again equation (16) in normalized form, it reads as follows:

$$\overline{I}_{ic} = (\alpha_1 \overline{D}^2 + \alpha_2/\overline{D}^2) \cdot \frac{\overline{D}}{\overline{\phi}} \cdot \frac{d\overline{s}}{dt} \tag{16}$$

where
$\overline{D}$ = normalized diameter with $\overline{D}_{max} = 1$
$\overline{\phi}$ = normalized motor flux with $\overline{\phi}_{max} = 1$
$\overline{S}$ = normalized line (material) speed with $\overline{S}_{max} = 1$.

Normalized computations are done separately and the required signal is obtained by multiplying the equation (16) by an appropriate scaling factor. The right hand side of equation (16) consists of three factors. The first factor (within the brackets) is generally referred to as the "J" function.

The second factor $\overline{D}/\overline{\phi}$ provides compensation for the "state" of the flux in the motor air gap and, therefore, depends upon the type of the reel system. The third factor, $d\overline{s}/dt$, establishes the magnitude and the polarity of the "IC" current proportional to the acceleration or deceleration rates of the strips. Similarly, the block diagram of FIG. 16 includes three parts. One is used to generate a signal "$\overline{J}$" = $(\alpha_1 \overline{D}^2 + \alpha_2/\overline{D}^2)$. The output of this first part is multiplied by a derivation signal which is representative of ds/dt. This operation is achieved in the second part of the circuit. Thirdly, the factor $\overline{D}/\overline{\phi}$ is computed, thus, in a third part of the circuit of FIG. 16.

Regarding the "$\overline{J}$" signal, namely $(\alpha_1 \overline{D}^2 + \alpha_2/\overline{D}^2)$, it is observed that a count of 4,095 (decimal) produces 10 V output through the associated D/A converter and that such 10 V output represents the current limit in an analog controlled drive system. The count represents the current limit. If the per-unit current limit is defined as K, the count to represent the rated current signal will be 4,095/K. The dimensionless function $(\alpha_1 \overline{D}^2 + \alpha_2/\overline{D}^2)$ can, therefore, be converted into an equivalent count by multiplying the expression by 4,095/K, that is:

$$"J" = \frac{4,095}{K} \cdot J = \left(4,095 \alpha_1 \cdot \overline{D}^2 + \frac{4095}{\overline{D}^2} \cdot \alpha_2\right) \frac{1}{K}$$

Referring to FIG. 16, the value of the diameter $\overline{D}$ is derived and stored in holding register HR01 of line 201, in accordance with the technique shown and the implementation made in the programmable controller in the aforementioned copending patent application Serial No. 06/401,425 filed concurrently by B. S. Surana and W. H. Snedden. The value of $\overline{D}$ in HR01 is multiplied by itself from HR02 within multiplier MP300 and stored in double holding register HR03, HR04. Thus, $\overline{D}^2$ is derived at the output on line 202, and junction $J_1$. In this respect, it is recalled that in the Numa-Logic PC700, multiplication of a number X a four-digit decimal number 9,999 produces a number X in the high order register. That is, the count of 9,999 represents unity for mathematical operations. Thus, we can represent the maximum diameter $\overline{D}$ by 9,999. If this number is multiplied by itself, then $\overline{D}^2$ results. With the scaling this is such that when $\overline{D} = 1$ p.u.; $\overline{D}^2 = 9,999 = 10^4$, or 1 p.u.

From junction $J_1$ the value $\overline{D}^2$ is, via line 203, carried to a divider function DV302 where it is used as the divider in relation to the constant K used as the numerator, the latter being derived from line 204. The dividend is derived from the value stored in double holding register HR05 and HR06 to provide the equivalent count 4,095 for coefficient K, whereas the divider is the value stored in double register HR03, HR04, whereby $K/\overline{D}^2$, on line 205, also appears in double holding register HR07, HR08. Since the maximum value of $\overline{D}$ can be as low as 0.1 p.u. (for a 10 to 1 range), the generation of $1/\overline{D}^2$ requires careful scaling in order to avoid overflow conditions in the registers. Therefore, the inversion of $\overline{D}^2$, required to obtain $1/\overline{D}^2$, is achieved by choosing a very small numerator and then increasing the $\alpha_2$ factor proportionally to compensate for it. That is, $$\frac{4095}{\overline{D}^2} \cdot \alpha_2 = \frac{10^4 \times (40.95)}{10^4 \times \overline{D}^2} (10^2 \alpha_2)$$

The numerator (operand 1) for the divide function is set at $(40.95)10^4$, which includes the factor $10^4$ to represent the p.u. value of $\overline{D}^2$. Therefore, the numerator is stored in two separate registers with 0040 in the high order and 9500 in the low order. The output of the divide circuit, on line 205, is then multiplied through function MP303 by a $[(10^2 \alpha_2)10^4]$ count (stored in HR12 and supplied by line 206) to produce the desired count of $(4095 \cdot \alpha_2)/\overline{D}^2$. Interestingly enough, this multiplying factor rounds itself to an even $\alpha_2 \cdot 10^6$. For most applications the value of $\alpha_2$ is generally very small and therefore this factor falls within the acceptable limits for operands. For example, in an application where 200% I.C. current is required at the minimum diameter of $\overline{D} = 0.1$, the effect of $\alpha_1$ will be negligible and $\alpha_2$ will have to be no greater than $2 \times 10^{-13}$. This will result in a total multiplying factor of 2,000. However, in applications where diameter range is no greater than 4:1, the numerator for the $1/\overline{D}^2$ term and the multiplying factor for $\alpha_2$ can be rearranged to $(409.5)10^4$ and $(\alpha_2)10^5$, respectively. The result of function MP303 is, on line 207, equal to $\alpha_2/\overline{D}^2$.

The term $\alpha_1 \overline{D}^2$ is obtained with $\overline{D}^2$ on line 208 from junction $J_1$, and $\alpha_1$ from HR09 and line 209 into multiplier function MP301. The output on line 210 goes into double holding register HR10 and HR11.

An adder function AD304 combines $\alpha_1 \overline{D}^2$ of line 210 and $\alpha_2/\overline{D}^2$ of line 207, which sum is stored into HR15 (line 212). This is the value of $\overline{J}$ inputted in MP305.

The second term of equation (16) is $\overline{ds}/dt$. The $\overline{ds}/dt$ signal is derived from a ramp function generator which is fully disclosed in aforementioned copending patent application Ser. No. 06/401,287 filed concurrently by M. Safiuddin and W. H. Snedden. Signal $\overline{ds}/dt$ is stored into holding register HR16 and fed via line 213 to a multiplier function MP305 together with the contents of HR15 (line 212). Again, the output (line 214) is stored into double register HR17, HR18.

Since the "J" function has already been scaled for appropriate count on the basis of 4095 being the maximum, the scaling of $\overline{ds}/dt$ is straight forward. The coefficients of the J function ($\alpha_1$ and $\alpha_2$) are computed on the basis of the fastest acceleration/deceleration rates. The $\overline{ds}/dt$ signal (coming from the ramp function generator) is, therefore, calibrated for 9,999 to represent the unit rate of change of speed. The polarity of the inertia compensation signal is dictated by the polarity of the $\overline{ds}/dt$ signal. It should be positive for acceleration and negative for deceleration. Since all computations are carried out in absolute values, the polarity of the signal remains positive for both acceleration and deceleration. Therefore, the $I_C$ signal has to be added for acceleration to, or subtracted for deceleration from, the total current reference signal of the regulator.

Equation (16) also contains a term $D/\phi$. This signal takes different forms depending upon the type of reel control system. The three types generally known are the "constant horsepower", the "constant torque", and the "maximum torque" reel control system.

Accordingly, while one input of a multiplier function MP306 is the signal of line 214, a second input is derived from junction $J_2$ by line 216 which is one of three possible parallel circuits. The first circuit, on line 215 and holding register HR22, provides the value $\overline{U}$ which is moved by function MV307 to holding register HR19 when the system is of the "constant horsepower" type. The second circuit includes line 201 which, from HR01, provides the value of $\overline{D}$. This value is moved by move function MV308 into HR19 (line 216) when the system is of the "constant torque" type. The third circuit, at junction $J_2$, corresponds to the maximum torque" reel system. Two possibilities are to be considered: for $\overline{\omega} > 1$, the value $\overline{S}$ is supplied from holding register HR23 (line 217) via move function MV309 onto junction $J_2$ and line 216, whereas for $\overline{\omega} \leq 1$, the value $\overline{D}$ is supplied from line 2 and holding register HR01.

The selection between move function MF308 and MV309 is performed by a comparator GE311 which is responsive to the $\overline{\omega}$ signal contained in input register IR022 and to holding register HR025 containing 1000.

In the conventional "constant horsepower" reel system, the motor field flux $\overline{\omega}$ is always kept equal to the normalized diameter $\overline{D}$, that is, $\overline{D}/\overline{\phi}$ is always unity. The signal is, therefore, represented by $\overline{U} = 9999$. In the "constant torque" reel system, the motor field flux is always held constant at its rated value of $\bar{\phi}=1$ p.u. The signal $\bar{D}/\bar{\phi}$, thus, becomes equal to $\bar{D}$. In the "maximum torque" reel system, a field cross-over regulator is employed such that the flux be held at $\phi=1$ p.u. for all motor speeds $\omega \leq 1$ and the cemf be held at $\bar{V}_m = 1$ p.u. for all motor speeds $\bar{\omega} \geq 1$. The signal $\bar{D}/\phi$ can, therefore, be represented by $\bar{D}$ for all $\omega \leq 1$. For speeds $\omega > 1$, $\bar{D}/\bar{\phi}$ is multiplied and divided by the normalized motor speed $\omega$ which results in the signal $(\bar{D} \cdot \bar{\omega})$ which is the expression for the normalized line speed signal $\bar{S}$. The signal $\bar{D}/\phi$ can, therefore, be expressed as follows:

For $\bar{\omega} \leq 1$; $\bar{D}/\bar{\phi} = \bar{D}$.

For $\bar{\omega} > 1$; $(\bar{\omega} \cdot \bar{D})/(\bar{\phi} \cdot \omega^\phi) = \bar{S}/\bar{v}_m = \bar{S}$.

From line 216, the multiplier function MP306 provides the product of the three terms of equation (16). Then, on line 218, with double register HR20 and HR21 another multiplier function MP310 causes multiplication by the scaling coefficient $\alpha$ derived from holding register HR22 (line 219). The result on line 220 and holding register HR24 is $I_C$. Finally, this compensating current $I_c$ is combined with the current reference generator which establishes the reference level for the steady state motor current required for the desired strip tension F to produce the total current reference signal count. Alternatively, the current reference signal count for a steady state motor current can be added to the contents of double holding register HR17 and HR18 through an add or subtract function, before inputting to the multiply function of MP306.

The following table expresses numerical coefficients where $\bar{D}$ minimum $< 0.25$ and where $\bar{D}$ minimum $\geq 0.25$.

| Factors | $\bar{D}$ min. $< 0.25$ | $\bar{D}$ min $\geq .25$ |
|---|---|---|

$\Delta S/\Delta T = 9,999$ for the fastest acceleration or deceleration rate.

Figure 16A:
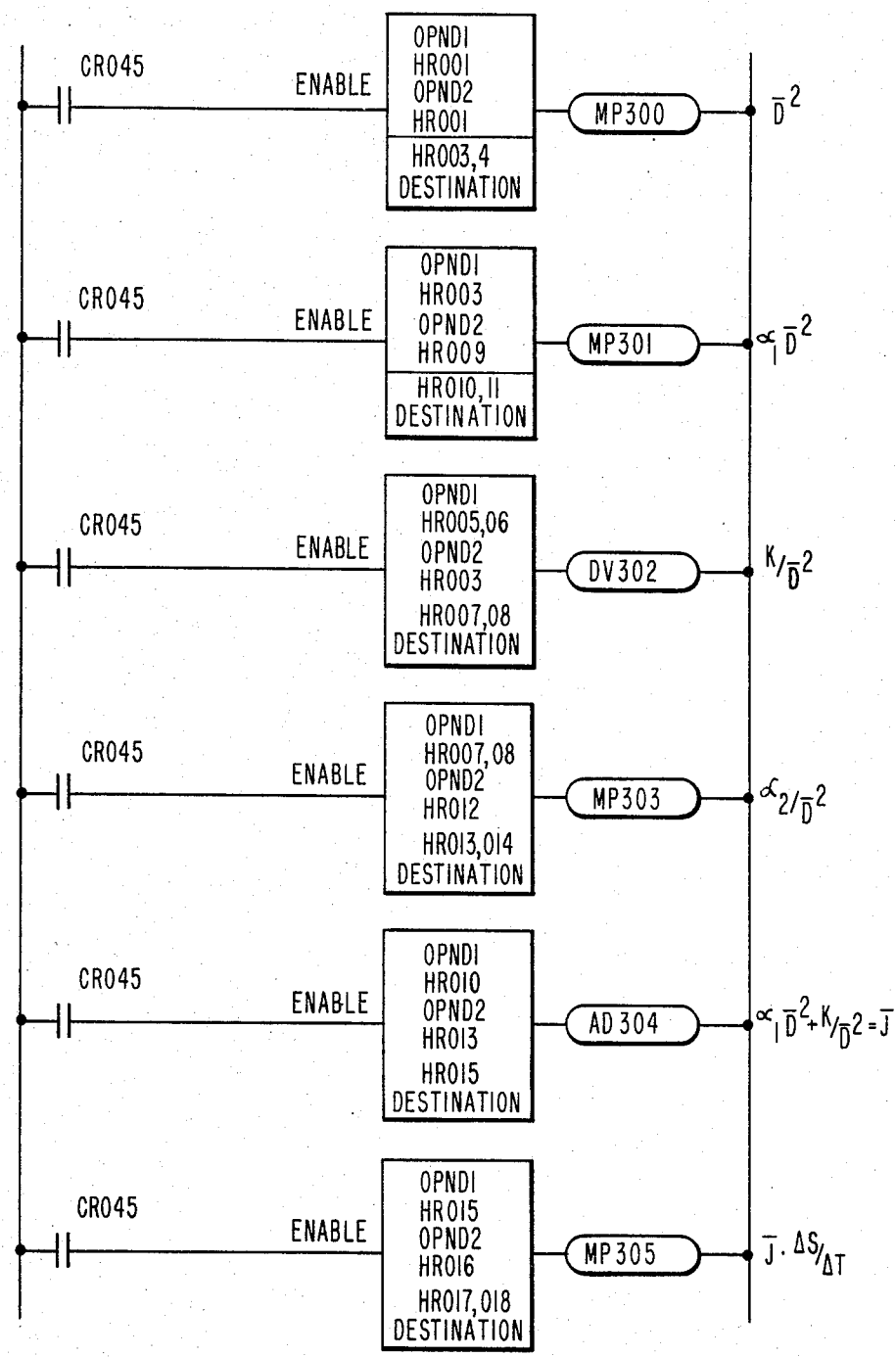
FIGS. 16A and 16B are a ladder diagram representation of operative steps of the block diagram of FIG. 15.
Figure 16B:
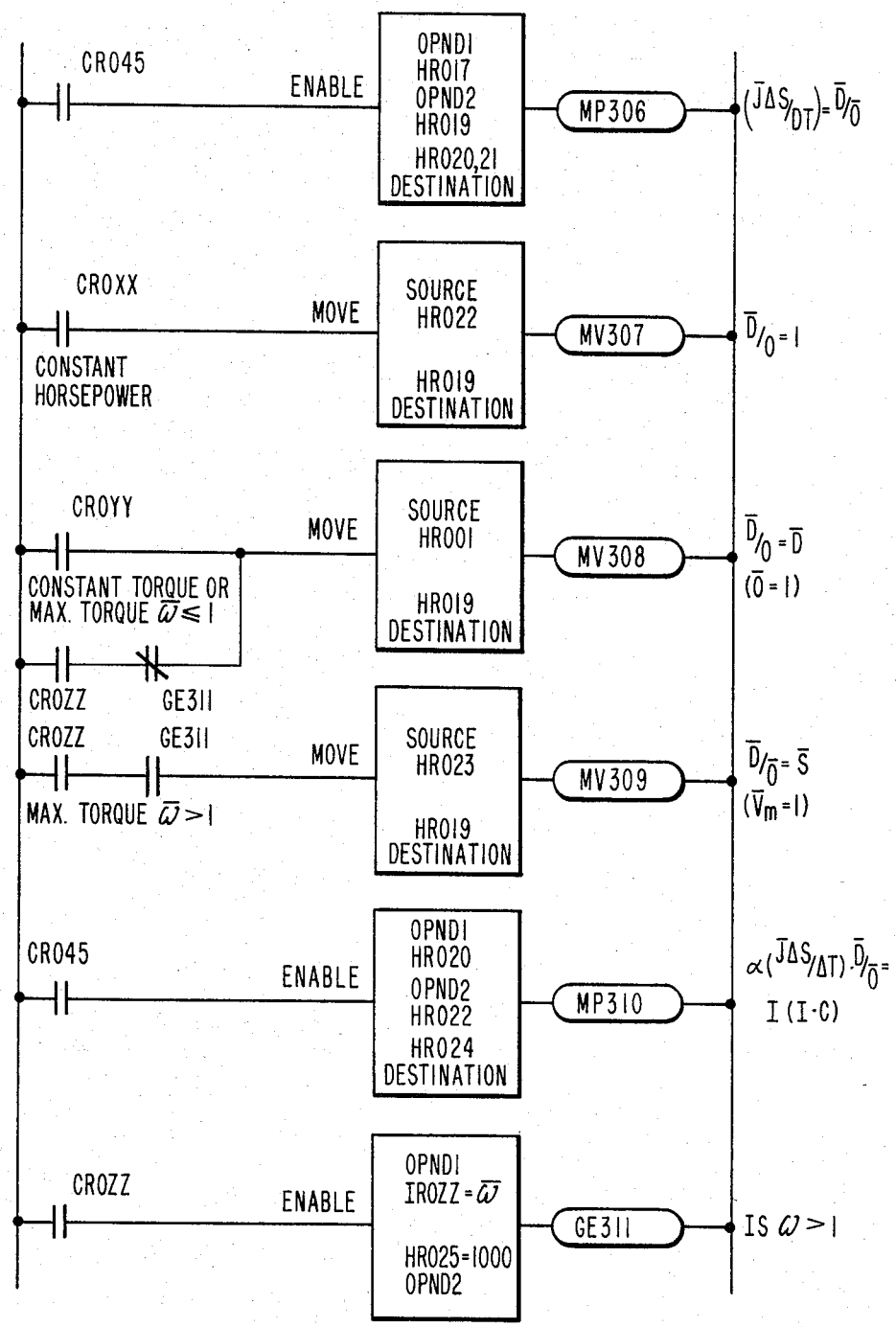

Referring to FIGS. 16A and 16B, the ladder diagram, as it appears before the key operator facing the program loader, corresponds to FIG. 15. The same reference appears indicating the holding register, the output register, the input register, the destination register and the source register, as the case may be. Line-per-line, during scanning of the ladder, FIGS. 16A–16B have the following correspondency to FIG. 15:

| Lines: | FIG. 15 | Explanation |
|---|---|---|
| (FIG. 16A) | | |
| 1 | 201, 202 | calculate $\bar{D}^2$ |
| 2 | 208, 209, 210 | calculate $\alpha_1 \bar{D}^2$ |
| 3 | 204, 203, 205 | calculate $K/\bar{D}^2$ |
| 4 | 205, 206, 207 | calculate $\alpha_2/\bar{D}^2$ |
| 5 | 210, 207, 212 | sum $(\alpha_1 \bar{D}^2 + \alpha_2/\bar{D}^2)$ |
| 6 | 212, 213, 214 | calculate $J \cdot \frac{ds}{dt}$ |
| (FIG. 16B) | | |
| 1 | J$_2$, 214, 216, 218 | calculate $\left(J \frac{\Delta S}{\Delta T}\right) \frac{\bar{D}}{\phi}$ |
| 2 | 215, J$_2$, 216 | select $\frac{\bar{D}}{\phi} = 1$ |
| 3 | 201, 2, J$_2$, 216 | select $\frac{\bar{D}}{\phi} = \bar{D}; (\bar{\phi} = 1)$ |
| 4 | 217, J$_2$, 216 | select $\frac{\bar{D}}{\phi} = \bar{S} (\bar{V}_m = 1)$ |
| 5 | 218, 219, 220 | calculate $\alpha$ (J $\Delta S/\Delta T) \cdot \frac{\bar{D}}{\phi}$ |
| 6 | GE 311 | select line 2 or line 217 |

SAMPLE CALCULATIONS

EXAMPLE 1

Constant Horsepower Reel System

For a constant horsepower reel system, the motor horsepower is matched to the required tension horsepower and the field flux range is matched to the diameter range. Therefore, for a reel system, with a 125 hp, 900/2500 rpm motor, the sample calculation will be as follows:

Assuming the following data, a sample calculation would be:

| | | | |
|---|---|---|---|
| Tension Horsepower (HP$_R$) | 125 | HP | (Same as motor rating) |
| Gear-in-speed (N$_R$) | 930 | RPM | |
| Motor inertia (W$_M$) | 134 | #FT$^2$ | (referred to the motor shaft) |
| Mandrel inertia (W$_c$) | 11.765 | #FT$^2$ | (referred to the motor shaft) |
| Strip inertia $\frac{W_{ST}D_R^2}{8(1 - D_c^2)G_R^2}$ | 487.63 | #FT$^2$ | (referred to the motor shaft) |
| Acceleration time (T$_A$) | 10 | SEC | |
| Normalized mandrel diameter (D$_c$) | .375 | | |

From Eq. (2), (3), and (4)

$$\bar{Z}_M = \frac{.615}{125}\left(\frac{930}{1000}\right)^2 \cdot \frac{1}{10} \cdot \frac{134}{1} = .057$$

$$\bar{Z}_1 = \frac{.615}{125}\left(\frac{930}{1000}\right)^2 \frac{1}{10} \cdot 487.63 = .2075$$

$$\bar{Z}_c = \frac{.615}{125}\left(\frac{930}{1000}\right)^2 \frac{1}{10} \cdot 11.765 = .005$$

The calculated values of $\bar{Z}_M$, $\bar{Z}_1$ and $\bar{Z}_c$ are then used in Eq. (1) to calculate the normalized value of current needed as a function of the diameter $\bar{D}$.

$$\bar{I}_{ic} \cdot = \bar{Z}_1\bar{D}^2 + (\bar{Z}_M + \bar{Z}_c - \bar{Z}_1\bar{D}_c^4)\frac{1}{\bar{D}^2} \quad (5)$$

$$\bar{I}_{ic} \cdot = .2075\bar{D}^2 + [.057 + .005 - (.2075)(.02)]\frac{1}{\bar{D}^2}$$

$$\bar{I}_{ic} \cdot = .2075\bar{D}^2 + .058 \frac{1}{\bar{D}^2}$$

$$\therefore \alpha_1 = .0275 \text{ and } \alpha_2 = .058$$

Since $D_{min}$ is 0.375 which is $\geq 0.25$, the factor K is $\phi 4\phi 9:5\phi\phi\phi$; $\quad v_1=4095\times 0.0275=\phi 85\phi$; $v_2/K=10^5 \alpha_2=5.8\phi\phi$. Assuming a 200% current limit for this example, $\alpha=9999/2$ $5,\phi\phi\phi$.

EXAMPLE 2

Constant Torque Reel System

For a constant torque reel system, the motor horsepower is selected such that the motor's rated torque matches the maximum tension load at maximum diameter and the rated motor speed matches the max. strip speed at minimum diameter. If a 30 hp, 1750 rpm motor is selected for a constant torque reel application with a maximum diameter of 40" and a minimum core of 3.5", the sample calculation will be as follows.

Given Date:
  Rated Line Speed $S_4 = 920$ FPM.
  Maximum Coil diameter $= 40''$
  Minimum Coil diameter $= 3.5''$
  Gear-ratio $G_R = 1.733$
  Motor & Core Inertia $(W_m + W_c) = 3.22$ lb.ft$^2$
  Density of the strip $= 169$ lbs/cu.ft.
  Width of the strip $= 53''$
  Accel. time to reach $S_4 = 10$ Sec.

The motor speed at min. dia. $= 920$ FPM $\times 12/\pi \times 3.5 \times 1.733 = 1740$ rpm
The rated diameter $D_R = 1.111 \times 40'' = 44.44''$
The gear-in speed $N_R = 3.5/44.44 \times 1740 = 137$ rpm
Normalized core dia. $\overline{D}_c = 3.5/44.44 = 0.07876$
Rated Tension Horsepower $HP_R = 30 \times 3.5''/40'' = 2.625$ HP $$\overline{Z}_1 = \frac{.615}{2.625}\left(\frac{137}{1000}\right)^2 \frac{1}{10}\ \frac{\pi}{32}\left[169\left(\frac{53}{12}\right)\left(\frac{44.44}{12}\right)^4 \frac{1}{(1.733)^2}\right]$$

$$= 2.0181$$

$$(\overline{Z}_m + \overline{Z}_c) = \frac{.615}{2.625}\left(\frac{137}{1000}\right)^2 \frac{1}{10} \cdot 3.22$$

$$= 1.411 \times 10^{-3}$$

$$\overline{I}_{ic} = (\overline{Z}_1\overline{D}^2 + (\overline{Z}_m + \overline{Z}_c - \overline{Z}_1\overline{D}^4)\frac{1}{\overline{D}^2} \cdot \frac{\overline{D}}{\phi}$$

$$= (2.0181\overline{D}^2 + (1.411 \times 10^{-3} - 2.0181(.07876)^4 \frac{1}{\overline{D}^2}\ \frac{\overline{D}}{\phi}$$

$$= \left(2.0181\overline{D}^2 + .00133\frac{1}{\overline{D}^2}\right)\frac{\overline{D}}{\phi}$$

$\therefore \alpha_1 = 2.0181$ and $\alpha_2 = .00133$

Since $D_{min}$ is 0.07876 which is less than 0.25, the factor K is $\phi\phi 40:95\phi\phi$; $v_1 = 4095 \times 2.0181 = 8264$.

$v_2/K = 10^6 \times 0.00133 = 1,330$.
Assuming a 150% current limit for this example, $\alpha = 9999/1.5 = 6,666$.

Since flux is always held at $\phi = 1$, $\overline{D}/\phi$ becomes $\overline{D}$.
MV3$\phi$8 in FIG. 1 is selected to move the value of $\overline{D}$ into HR19.

EXAMPLE 3.

Maximum Torque Reel System

Since flux $\phi$ is not kept equal to $\overline{D}$ in this system, the field range of the motor doesn't have to match the coil build-up (diameter range). The horsepower of the motor is, therefore, not necessarily equal to the tension horsepower. For example, in an application where a 500 HP, 600/1200 rpm motor is applied to a reel system with a diameter range of 20" to 68", the calculations will be as follows.

Given Data:
  Rated Line Speed $S_R = 750$ FPM
  Maximum Coil Dia. $= 68''$
  Minimum Coil Dia. $= 20''$
  Gear Ratio $= 8.4$
  Motor + Core Inertia $= 1270$ lb.ft.$^2$
  Coil Weight (max) $= 40,000$ lbs.
  Acceleration time to reach $S_R = 10$ Sec.
  Maximum Tension $= 13,200$ lbs.

Calculations:

Tension Horsepower $HP_R = \frac{13,200 \times 750}{33000} = 300$ HP

Rated diameter $D_R = 1.111 \times 68'' = 75.55''$

Gear-in-Speed $N_R$ @ $D_R$ and $S_R = \frac{750 \times 12}{\pi \times 75.55} \times 8.4 = 318.52$ Normalized mandrel dia. $\overline{D}_c = \frac{20}{75.55} = 0.2647$ Equivalent strip weight at $D_R = 50,257$ lbs.

$$\overline{Z}_1 = \frac{.615}{300}\left(\frac{318.5}{1000}\right)^2 \cdot$$

$$\frac{1}{10}\left[\frac{50,257}{8(1-(.2647)^2}\left(\frac{75.55}{12}\right)\frac{1}{(8.4)^2}\right]$$

$$= (20.8 \times 10^{-6})(3794.92)$$

$$= 78.9343 \times 10^{-3}$$

-continued $$(\bar{Z}_m + \bar{Z}_c) = \frac{.615}{300} \left(\frac{318.5}{1000}\right)^2 \frac{1}{10} (1270)$$

$$= (20.8 \times 10^{-6}) \, 1270$$

$$= 26.416 \times 10^{-3}$$

$$\bar{I}_{ic} = \left[\bar{Z}_1 \bar{D}^2 = (\bar{Z}_m = Z_c - \bar{Z}_1\bar{D}_c^4)\frac{1}{\bar{D}^2}\right]\frac{\bar{D}}{\phi}$$

$$= \left[0.0789\bar{D}^2 + (.0264 - (.0789)(.2647)^4)\frac{1}{\bar{D}^2}\right]\frac{\bar{D}}{\phi}$$

$$= \left[(0.0789)\bar{D}^2 + (.02601)\frac{1}{\bar{D}^2}\right]\frac{\bar{D}}{\phi}$$

$\therefore a_1 = 0.0789$ and $a_2 = 0.2601$

Since $D_{min}$ is 0.2647 which is $>0.25$, the factor K is $\phi 4\phi 9;5\phi\phi\phi$; $\nu_1 = 4095 \times 0.0789 = \phi 323$;

$$\nu_2/K = 10^5 a_2 = 2601.$$

Assuming a 175% current limit for this example, $a = 9999/1.75 = 5713$.

It is noted that, although the tension horsepower (300) is used in the calculations, the per-unit current $\bar{I}_{ic}$ is referred to the 500 HP motor's rated current.

Figure 17:
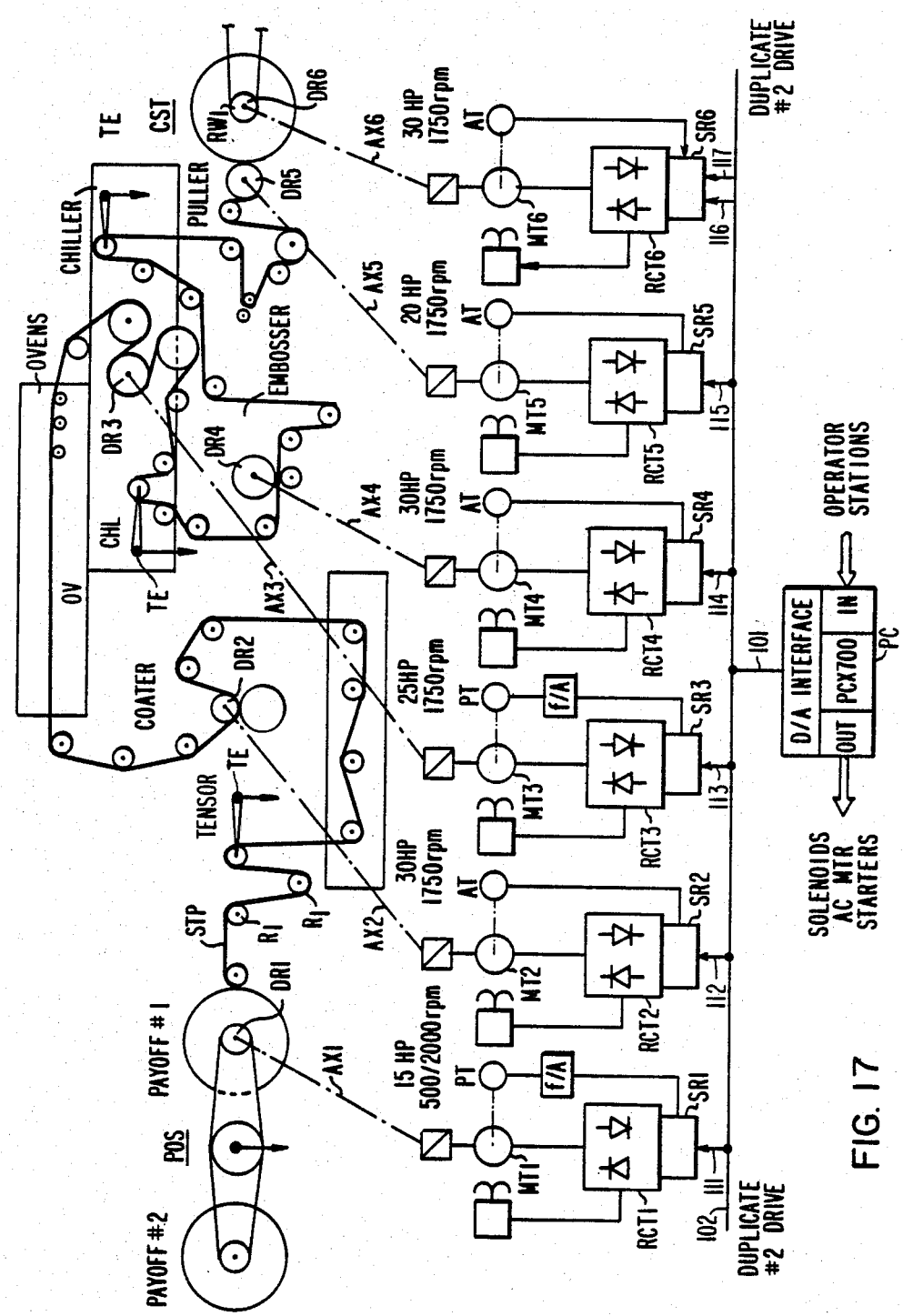
FIG. 17 is a block diagram showing the programmable controller according to the invention in a preferred embodiment application.

Referring to FIG. 17, a strip of aluminum foil STP is continuously passed between a series of rolls such as $R_1$ which belong to a tensor distributing evenly the tension as the strip leaves a pay-off station POS and reaches a coiling station CST.

Driving is effected on the strip STP at six points by driving rolls ($DR_1$-$DR_6$) which have to be driven along axes ($AX_1$-$AX_6$) at speeds determined by DC motors ($MT_1$-$MT_6$). These are part of a plurality of motor drives responding to a master reference signal and to individual speed control regulators ($SR_1$-$SR_6$) establishing instantaneously a precise speed relationship from one roll ($DR_1$-$DR_6$) to the next.

Several tests have to be performed by the control system of FIG. 17: (1) ensure an accurate determination of the diameter of the pay-off coil on the pay-off wheel $PO_1$ in service; (2) to control the speed of the pay-off coil as a function of encoding e.g. of coil diameter; (3) to control the speeds of all the coils (DR1-DR6) in a proper speed relationship according to mass flow and in a linear fashion through individual ramp functions, such as determined by the operator at the processing station in order to adjust the speed globally throughout the system; (4) to automatically establish inertia compensation as a function of the mass of metal on either the pay-off wheel $PO_1$ or the rewind wheel $RW_1$, at the coiling station ST; and (5) to effect such monitoring, control and adjustments with the assist of an operator for a plurality of parallel processing lines, such as the one shown in FIG. 17 for one parallel processing line, another parallel processing line being identified as a duplicate drive #2 by lines 102, 103 extending from a pay-off wheel and to a rewind wheel, respectively, at a pay-off station and at a coiling station.

More specifically, the aluminum foil strip STP is passed between rolls $R_1$ from the pay-off coil $PO_1$ through a tension equalizer TE, then, brought at the proper angle into a coater roll section driven by a driving roll DR2, then passed through an oven OV. The strip is driven by a driving roll DR3 disposed within a chiller CHL. From there it goes to an embosser EMB having a driving roll DR4 and is supplied by a driving roll DR5 to the rewind coil $RW_1$, itself driven by a driving roll DR6. Tension equalizers TE are properly staged at the two ends of the chiller section.

The motor drives are conventional. A rectifier section ($RCT_1 \ldots RCT_6$) supplies armature current to a DC motor ($MT_1$-$MT_6$). Each motor has a separate field excitation and a pilot tachometer controlling the speed regulator associated with the rectifier section. Depending upon their particular function along the process line, the motor drives have some different characteristics. Typically, motor $MT_1$ which drives the pay-off wheel is a 15 HP motor having a speed varying between 500 and 2000 RPM. Motor $MT_2$ driving the coater roll is a 30 HP motor of base speed 1750 RPM. Motor $MT_3$ is a 25 HP motor of base speed 1750 RPM. For the embosser, the motor $MT_4$ has 30 HP and 1750 RPM. The puller motor $MT_5$ has 20 HP and 1750 RPM. The winder motor $MT_6$ is a 30 HP and 1750 RPM motor.

All these motors are operating in parallel controlled via lines 111 to 117 in accordance with a master reference speed. For any change in the master reference control signal from line 101, each individual motor speed along the process line should receive a distributed amount of change, and this can be done in parallel from one process line (such as shown) to another (like duplicate drive #2 not shown), simultaneously or individually. To this effect, according to the present invention, a digital programmable controller PC is provided responding to the operator's programming instructions and the process output signals, via an input section ISC, and generating between the input section and an output section OSC the prescribed command input signals, on lines 101 and 111–117 to the individual motor drive regulators. The programmable controller PC, and the associated input and output sections are preferably of the NUMA-LOGIC (a Westinghouse trademark) type, e.g., a small compact, microprocessor-based programmable controller of rugged and low-cost construction, easy to operate from an unskilled programmer's point of view.

In accordance with the present invention, such simple and known programmable controller system has been modified and improved in order to provide sophisticated functions for automatic control and monitoring of a motor drive system such as the one illustrated by FIG. 17.

From the explanations given regarding FIGS. 11 and 15, it appears that the programmable controller permits an operator who is not knowledgeable in computer software, to effectively control the speed of the system so as to choose a ramp rate, to increase or decrease speed, to automatically reach a preset level of speed, to start or stop the motor drive. Moreover, the programmable controller exercises automatically all the prescribed routines of coasting to the set point speed reference, of emergency stop, of holding the assigned speed reference. All this is effected while taking advantage of the inherent stability of the controller in fixing values which are precise and free of drift.

The torque required to accelerate a rotating mass having an inertia J can be expressed as follows.

$$T_{ac} = J \frac{d\omega}{dt} \tag{1}$$

where
$T_{ac}$ = accel/decel torque
$J$ = moment of inertia
$\omega$ = speed in radians/sec.

The motor current required to produce this torque is given by, $$T_{ac} = K'_T \phi_M I_{ac} \tag{2}$$

where
$K'_T$ = Torque Constant in Ft.lb/Ampere Weber
$\phi$ = Motor Flux in Webers
$I$ = Motor Armature Current in Amps
Equating Eq. 1 and Eq. 2 gives $$K_T' \phi I_{ic} = J \frac{d\omega}{DT}$$

Normalizing the above equation gives $$\frac{K'_T \phi I_{ic}}{K'_T \phi_R I_R} = \frac{J}{K'_T \phi_R I_R} \cdot \frac{d\omega}{dt} \tag{3}$$

$$\frac{\phi I_{ic}}{\phi_R I_R} = \frac{J}{K'_T \phi I_R} \cdot \frac{\omega_R}{\omega_R} \cdot \frac{d\omega}{dt}$$

$$\overline{\phi} \overline{I}_{ac} = \frac{J\omega_R}{K_T I_R} \cdot \frac{d\overline{\omega}}{dt}$$

where, $$\overline{\phi} = \frac{\phi}{\phi_R}; \overline{I}_{ic} = \frac{I_{ic}}{I_R}; \overline{\omega} = \frac{\omega}{\omega_R}; K_T = K'_T$$

Expressing the rotational speed in terms of a linear velocity S and diameter D, a substitution can be made in Eq. (3).

$$\omega = \frac{S}{\pi D} \tag{4}$$

$$\overline{\omega} = \overline{S} \frac{1}{\overline{D}}$$

$$\overline{\phi} \overline{I}_{ac} = \frac{J\omega_R}{K_T I_R} \frac{1}{\overline{D}} \frac{d\overline{V}}{dt}$$

Also expressing rated motor speed in RPM as a function of rated voltage $V_R$ gives $$\omega_R = \frac{V_R}{K_V' \phi_R}$$

$$\omega_R = \frac{V_R}{K_V} \text{ where } K_V = K_V' \phi_R$$

Substituting these expressions into Eq. (4)

$$\overline{\phi} \overline{I}_{ac} = \frac{JV_R}{K_T K_V I_R} \frac{1}{\overline{D}} \frac{d\overline{V}}{dt} \tag{5}$$

or $$\overline{I}_{ac} = Z \frac{1}{\overline{\phi} \overline{D}} \cdot \frac{d\overline{S}}{dt} = Z \frac{1}{\overline{D}^2} \cdot \frac{\overline{D}}{\overline{\phi}} \cdot \frac{d\overline{S}}{dt}$$

where $$Z = \frac{JV_R}{K_T K_V I_R}$$

$$\frac{d\overline{S}}{dt} = \text{line acceleration rate}$$

If the time variable t in $d\overline{S}/dt$ is also normalized on the basis of the fastest accel time $T_A$ to reach rated speed $S_R$, the acceleration rate also becomes normalized with a value of 1 for the fastest rate.

Equation 5 then becomes $$\overline{I}_{ic} = \frac{Z}{T_A} \cdot \frac{1}{\overline{D}^2} \cdot \frac{\overline{D}}{\overline{\phi}} \cdot \frac{d\overline{s}}{dt} \tag{b}$$

The dimension for both Z and $T_A$ is time in seconds. Therefore $(Z/T_A)$ is expressed as a normalized time constant $\overline{Z}$. That is, $$\overline{I}_{ic} = \overline{Z} \cdot \frac{1}{\overline{D}^2} \cdot \frac{d\overline{s}}{dt} \cdot \frac{\overline{D}}{\overline{\phi}} \tag{7}$$

Each term of the above equation is a dimensionless variable.

Since Z depends upon the inertia of the coil, motor, and associated mechanical system, it can be described as a sum of several time constants.

$$Z = \frac{JV_R}{K_T K_V I_R} \quad Z = \frac{\left(\frac{WK^2}{32.2}\right) \omega_R}{T_R} \tag{8}$$

$$Z = \frac{WK^2 \cdot N_R \cdot N_R(2\pi)}{(32.2)(5250)HP_R(60)}$$

$$Z = .615 \left(\frac{N_R}{1000}\right)^2 \frac{WK^2}{HP_R}$$

or $$Z = \frac{.615}{HP_R} \left(\frac{N_R}{1000}\right)^2 [W_M + W_c + W_s]$$

where
$N_R$ = rated motor speed at full field in RPM
$HP_R$ = rated motor horsepower
$W_M$ = gear and motor inertia referred to the motor shaft
$W_c$ = strip (coil) inertia referred to the motor shaft
The following is true by definition.

$$\overline{Z}_M = \frac{.615}{HP_R} \left(\frac{N_R}{1000}\right)^2 \frac{W_M}{T_A}$$

$$\overline{Z}_c = \frac{.615}{HP_R} \left(\frac{N_R}{1000}\right)^2 \frac{W_c}{T_A}$$

-continued $$\overline{Z}_s = \frac{.615}{HP_R} \left(\frac{N_R}{1000}\right)^2 \frac{W_s}{T_A}$$

Substituting these values into Eq. (7) gives $$\overline{I}_{ic} = (\overline{Z}_M + \overline{Z}_c + \overline{Z}_s) \cdot \frac{1}{\overline{D}^2} \cdot \frac{d\overline{s}}{dt} \cdot \frac{\overline{D}}{\phi} \tag{9}$$

The inertia of the strip $W_s$ can be expressed as a function of coil diameter D.

$$W_s = \rho_s L_s \frac{\pi}{32} (D^4 - D_c^4) \tag{10}$$

$$W_s = \rho_s L_s \frac{\pi}{32} D_R^4 (\overline{D}^4 - \overline{D}_c^4)$$

where,
$\rho_s$ = strip density in LBS/CU FT
$L_s$ = strip width in FT
D = coil diameter in FT
$D_R$ = Maximum Coil Diameter in FT
$D_c$ = mandrel diameter in FT
Using Eq. (10) in Eq. (9)

$$\overline{I}_{ic} = \left[(\overline{Z}_M + \overline{Z}_c)\frac{1}{\overline{D}^2} + \overline{Z}_1\left(\overline{D}^2 - \frac{\overline{D}_c^4}{\overline{D}^2}\right)\right] \cdot \frac{d\overline{s}}{dt} \cdot \frac{\overline{D}}{\phi}$$

where, $$\overline{Z}_1 = \frac{.615}{HP_R} \left(\frac{N_R}{1000}\right)^2 \frac{1}{T_A} \cdot \frac{\pi}{32} \rho_s L_s D_R^4 \left(\frac{1}{G_R}\right)^2$$

The final equation then becomes $$\overline{I}_{ac} = \left[\overline{Z}_1\overline{D}^2 + (\overline{Z}_M + Z_c - \overline{Z}_1\overline{D}_c^4)\frac{1}{\overline{D}^2}\right] \frac{d\overline{S}}{dt} \cdot \frac{\overline{D}}{\phi} \tag{11}$$

with $$\overline{Z}_M = \frac{.615}{HP_R} \left(\frac{N_R}{1000}\right)^2 \frac{W_M}{T_A}$$

$$\overline{Z}_c = \frac{.615}{HP_R} \frac{N_R}{1000}^2 \frac{1}{T_A} \frac{\pi}{32} \rho_c L_c D_c^4 \frac{1}{G_R}^2$$

$$\overline{Z}_1 = \frac{.615}{HP_R} \frac{N_R}{1000}^2 \frac{1}{T_A} \frac{\pi}{32} \rho_s L_s D_R^4 \frac{1}{G_R}^2$$

I claim:

1. In a line for processing a strip of material moving from a pay-off to a winding reel, each reel being driven by a direct current motor drive system at controllable speeds, with strip material being accumulated at speeds on such reel to a diameter D; and said direct current motor drive system being controlled in relation to a current reference control signal; with said direct current motor drive system further including means for deriving a normalized signal $\overline{D}$ from said diameter D; means for deriving a normalized signal $\overline{S}$ from said speed S and means for deriving a normalized signal $\Delta\overline{S}/\Delta t$ from said speed S; and a programmable controller comprising:

means responsive to said $\overline{D}$ signal and to said $\Delta\overline{S}/\Delta t$ signal for deriving a normalized representation $\overline{J}$ of the moment of inertia J of said reel in accordance with the formula $$J = (a_1 \bullet \overline{D}^2 + a_2/\overline{D}^2)\Delta\overline{S}/\Delta t;$$

means responsive to said $\overline{D}$ signal and to said $\overline{J}$ signal for deriving a signal representative of the product $\overline{J} \times \overline{D}$; and means for outputting a signal representative of said $\overline{J} \times \overline{D}$ product as a representation of said current reference control signal.

2. In a line for processing a strip of material moving from a pay-off to a winding reel, each reel being driven by a direct current motor drive system at controllable speeds, with strip material being accumulated at speed S on such reel to a diameter D; and said direct current motor drive system being controlled in relation to a current reference control signal; with said direct current motor drive system further including means for deriving a normalized signal $\overline{D}$ from said diameter D; means for deriving a normalized signal $\overline{S}$ from said speed S and means for deriving a normalized signal $\Delta\overline{S}/\Delta t$ from said speed S; and a programmable controller comprising:

means responsive to said $\overline{D}$ signal and to said $\Delta\overline{S}/\Delta t$ signal for deriving a normalized representation $\overline{J}$ of the moment of inertia J of said reel in accordance with the formula $$\overline{J} = (a_1 \bullet \overline{D}^2 + a_2/\overline{D}^2)\Delta\overline{S}/\Delta t;$$

means responsive to said $\overline{D}$ signal and to said $\overline{J}$ signal for deriving a signal representative of the product $\overline{J} \times \overline{D}$; and means responsive to a $\overline{U}$ signal representing unity and to said $\overline{J}$ signal for deriving a signal representative of the product $\overline{J} \times \overline{U}$; and means for outputting a signal representative of said $\overline{J} \times \overline{U}$ product as a representation of said current reference control signal.

3. In a line for processing a strip of material moving from a pay-off to a winding reel, each reel being driven by a direct current motor drive system at controllable speeds, with strip material being accumulated at speeds on such reel to a diameter D; and said direct current motor drive system being controlled in relation to a current reference control signal; with said direct current motor drive system further including means for deriving a normalized signal $\overline{D}$ from said diameter D; means for deriving a normalized signal $\overline{S}$ from said speed S and means for deriving a normalized signal $\Delta\overline{S}/\Delta t$ from said speed S; and a programmable controller comprising:

means responsive to said $\overline{D}$ signal and to said $\Delta\overline{S}/\Delta t$ signal for deriving a normalized representation $\overline{J}$ of the moment of inertia J of said reel in accordance with the formula $$J = (a_1 \bullet D^2 + a_2/D^2)\Delta S/\Delta t;$$

means responsive to said $\overline{D}$ signal and to said $\overline{J}$ signal for deriving a signal representative of the product $\overline{J} \times \overline{D}$;

means responsive to said $\overline{S}$ signal and to stand $\overline{J}$ signal for deriving a signal representative of the product $\overline{J} \bullet \overline{S}$; and means for outputting a signal representative of said $\overline{J} \bullet \overline{S}$ product as a representation of said current reference control signal.

* * * * *